J. C. WACHA.
SAFETY CATCH.
APPLICATION FILED DEC. 18, 1916.

1,228,994.

Patented June 5, 1917.

Inventor:
John C. Wacha
By Horatio E. Bellows
Attorney:

ated the length of the sleeve. Integral with
UNITED STATES PATENT OFFICE.

JOHN C. WACHA, OF PROVIDENCE, RHODE ISLAND, ASSIGNOR TO GEORGE H. CAHOONE COMPANY, A CORPORATION OF RHODE ISLAND.

SAFETY-CATCH.

1,228,994. Specification of Letters Patent. Patented June 5, 1917.

Application filed December 18, 1916. Serial No. 137,525.

*To all whom it may concern:*

Be it known that I, JOHN C. WACHA, a citizen of the United States, residing at Providence, in the county of Providence and State of Rhode Island, have invented certain new and useful Improvements in Safety-Catches, of which the following is a specification.

My invention relates to breast pins, badges, and other structures of the safety pin type, and more particularly to the catch for the pin tongue.

The essential objects of my invention are to provide a catch having the properties characteristic of a safety catch including a guard for the point against exposure; to securely lock the pin point in its engaged position; to cheapen and strengthen the construction of this class of devices; and to facilitate the manipulation of the locking mechanism by the operator in engaging and disengaging the tongue from the catch.

To the above ends essentially my invention consists in such parts and combinations of parts as fall within the scope of the appended claims.

In the accompanying drawings which form a part of this specification—

Figure 1:
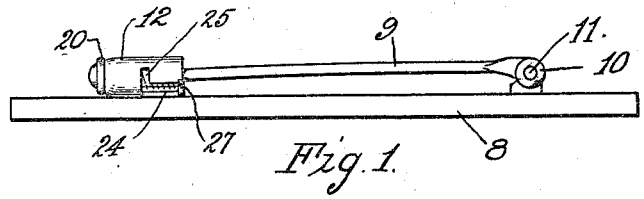
Figure 2:
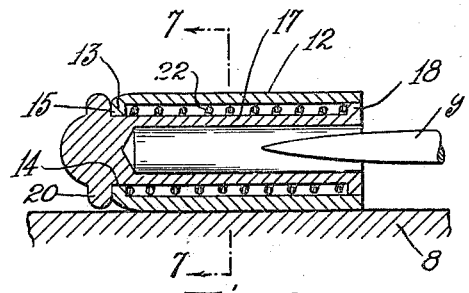
Figure 3:
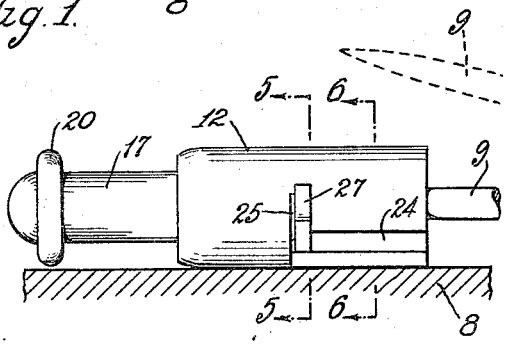
Figure 4:
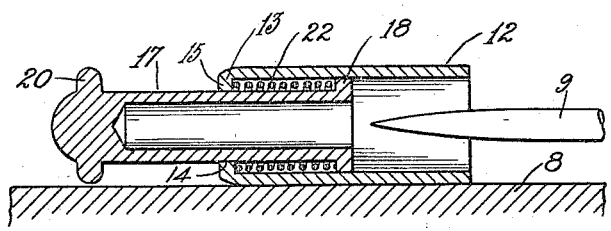
Figure 5:
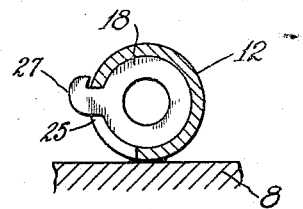
Figure 6:
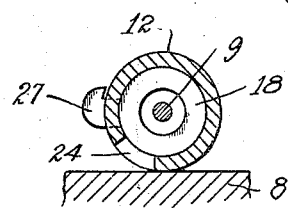
Figure 7:
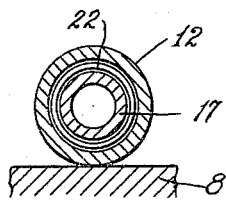

Figure 1 is a side elevation of a pin embodying my invention,

Fig. 2, a central vertical longitudinal section of the catch member and the adjacent portion of the body showing the pin tongue partially broken away, Fig. 3, a side elevation of the catch locked in open position showing in broken lines a position that the pin tongue may assume after release from the catch, Fig. 4, a longitudinal section of the catch in locked position, Figs. 5 and 6, sections on line 5—5 and 6—6 respectively of Fig. 3, and Fig. 7, a transverse section on line 7—7 of Fig. 2.

Like reference characters indicate like parts throughout the views.

In the accompanying drawings, my catch is shown mounted on the body 8 of a pin having a pin tongue 9 mounted in a joint 10 by pintle 11.

The catch comprises a tubular sleeve or casing 12 preferably open at its inner end and having a closed outer end wall 13 provided with a circular opening 14 whereby is formed an end shoulder 15. Mounted in this sleeve is a tubular slide or housing comprising a wall 17 of less diameter than the sleeve whereby the wall is spaced from the sleeve, and having upon its inner end an annular flange or shoulder 18 in sliding contact with the sleeve. The sleeve is a sliding fit in the opening 14 and upon its outer end is provided with an annular shoulder 20. A helical spring 22 surrounds the slide and has one end abutting against the shoulder 18 and its other end pressing against the shoulder 15, whereby the shoulder 20 or head porton is normally held against the outer end of the member 12. The sleeve 12 is provided with a bayonet slot comprising a longitudinal portion 24 extending from the inner end of the sleeve near the bottom thereof, and a vertical portion 25 extending from the end of the portion 24 intermediate the length of the sleeve. Integral with the periphery of the shoulder 18 is a thumb piece or projection 27 which extends through the slot 24 and projects exterior of the surface of the sleeve 12. The thumb piece is of such dimensions as to readily slide in the slots or slot 24 and 25. The sleeve 12 is fixed to the body at such a distance relatively to the pin joint 10 as to permit the point of the pin tongue to extend some distance within the tube or slide 17.

The operation of the device is as follows: Assuming the pin tongue to be disengaged from the catch, and it being desired to engage the same, the tongue is manually moved from its position shown in broken lines in Fig. 3 down to the plane of the slot 24 and is pushed therethrough into the sleeve 12. This is done after the operator has with his thumb or finger pressed rearwardly upon the thumb piece 27 and has slid the member 17 thereby longitudinally until the thumb piece reached the bottom of the slot 25 and then rotated the member 17 and thus raised the thumb piece up into the slot 25 where the extended parts were held frictionally in position by virtue of the pressure of the spring 22. It will be observed therefore that the extension of the member 17 which was the initial step left the parts in readiness to receive the pin tongue which constituted the second step, without the necessity of the operator continuing to hold his thumb or finger in contact with the member 25, since the parts were temporarily locked in their position. The next or third step is to complete the engagement by depressing the thumb piece 27 until it reaches the plane of the slot 24 whereupon the spring forces the slide 17 back to its original position, as shown in Fig. 2, by which means the end of the pin tongue 9 is inclosed thereby. In order to release the pin tongue from the normal or closed position of the catch shown in Figs. 1 and 2, the finger piece is operated to expand and lock the parts in the position shown in Figs. 3 and 4, and the end of the pin tongue is then released so as to permit its being manually withdrawn through the slot 24.

I claim:—

1. In a pin, the combination with the body and pin tongue, of a sleeve fixed to the body in the path of the tongue provided with a longitudinal slot and a vertical slot extending from the first slot, a helical spring within the sleeve, a tube slidably and rotatably mounted in the tube within the spring, and a thumb piece on the tube registering in the first slot.

2. In a pin, the combination with the body and pin tongue, of a sleeve fixed to the body in the path of the tongue, an annular shoulder on one end of the sleeve, said sleeve being provided with a horizontal slot and with a vertical slot opening into the first slot, a tube slidably and rotatably mounted in the shoulder, a shoulder on the tube in contact with the sleeve, a spring in the sleeve surrounding the tube bearing against the shoulders, and a stop shoulder on the tube exterior of the sleeve.

3. In a pin, the combination with the body, of a sleeve fixed to the body in the path of the tongue provided with a longitudinal slot and with a vertical slot extending from the first slot, a tube rotatably and longitudinally yieldingly mounted within the sleeve adapted to normally inclose the end of the pin tongue, and adapted when extended to move beyond the end of the pin tongue, and a thumb piece upon the sleeve adapted to register in the slots.

4. In a pin, the combination with the body and pin tongue, of a sleeve fixed to the body in the path of the tongue and provided with a longitudinal slot adapted to admit the end of the pin tongue, a yielding tube rotatably and slidably mounted in the sleeve movable over and out of contact with the pin tongue, and means upon the tube coöperating with the sleeve for locking the tube out of the path of the tongue.

In testimony whereof I have affixed my signature in presence of two witnesses.

JOHN C. WACHA.

Witnesses:
HORATIO E. BELLOWS,
CHARLES S. JENCKES.

Copies of this patent may be obtained for five cents each, by addressing the "Commissioner of Patents, Washington, D. C."